United States Patent [19]

Verhagen et al.

[11] 4,436,760
[45] Mar. 13, 1984

[54] LOW-CALORIE SPREAD BASED ON A LOW-MELTING BUTTERFAT FRACTION

[75] Inventors: Laurentius A. M. Verhagen; Leendert G. Warnaar, both of Vlaardingen, Netherlands

[73] Assignee: Lever Brothers Company, New York, N.Y.

[21] Appl. No.: 362,413

[22] Filed: Mar. 26, 1982

[30] Foreign Application Priority Data

Apr. 2, 1981 [NL] Netherlands .................. 8101638

[51] Int. Cl.³ .............................................. A23D 3/02
[52] U.S. Cl. .................................. 426/603; 426/608; 426/586
[58] Field of Search .............. 426/586, 602, 603, 608, 426/581, 663, 664

[56] References Cited

U.S. PATENT DOCUMENTS

| | | | |
|---|---|---|---|
| 2,217,309 | 10/1940 | Epstein et al. ............... | 426/603 X |
| 2,745,750 | 5/1956 | Shafer et al. ............... | 426/603 |
| 3,519,435 | 7/1970 | MacCollom ............... | 426/586 |
| 4,005,228 | 1/1977 | Norris ............... | 426/586 |
| 4,307,125 | 12/1981 | Amer ............... | 426/586 X |
| 4,316,919 | 2/1982 | Pelloso et al. ............... | 426/603 |
| 4,360,536 | 11/1982 | Keuning et al. ............... | 426/603 |
| 4,362,758 | 12/1982 | MacNeill et al. ............... | 426/603 |

FOREIGN PATENT DOCUMENTS 1525315  9/1978  United Kingdom .

*Primary Examiner*—Robert A. Yoncoskie
*Attorney, Agent, or Firm*—Amirali Y. Haidri; James J. Farrell

[57] ABSTRACT

The invention relates to a low-calorie spread based on a low-melting butterfat fraction, which has an improved spreadability at 10° C. as compared with low-calorie butter. The low-melting butterfat fraction is an olein preferably obtained by dry fractionation of butterfat within the temperature range of 20°–30° C.

3 Claims, No Drawings

LOW-CALORIE SPREAD BASED ON A LOW-MELTING BUTTERFAT FRACTION

The invention relates to a water-in-oil emulsion based on a low-melting butterfat fraction, as well as to a process for preparing this product. More specifically the invention relates to a low calorie spread based on butterfat which has an improved spreadability at 10° C. as compared with low calorie butter.

A low calorie spread is understood to be a water-in-oil emulsion having a water content exceeding the customary water content of butter or classical margarines. The water content of the product according to the invention therefore is higher than 20% and preferably ranges from 40 to 70%, based on the total composition.

A low calorie butter is usually understood to be a product which has been prepared starting from non-fractionated butter, or butter of which the water content has been increased to 35–70%. Such a product, which has been described in GB Pat. No. 1 525 315, is unsufficiently spreadable and tends towards water exudation, manifesting itself in the form of water droplets on the surface. Besides, spreading of the product on bread results in the formation of a grainy structure, which gives an unpleasant experience to the consumer.

According to Example 9 of GB Pat. No. 1 525 315 already discussed above, such a low calorie product is prepared starting from a mixture of 70% of a butterfat fraction, obtained by means of a fractionation at 15° C.—of which no further details are given—and 30% of non-fractionated butter oil, or starting from mixtures of a vegetable oil and a non-fractionated butter oil. However, the prescription of Example 3 is difficult to reproduce, on the one hand because any indication fails as to whether the butterfat fraction was obtained by means of wet fractionation (in the presence of a solvent) or by dry fraction (in the absence of a solvent) and on the other hand because there is no indication as to whether the low-melting olein fraction or the high-melting stearin fraction has been incorporated in the product.

At present there is a need for a product having a better spreadability than low calorie butter and a good stability on storage and comprising an aqueous phase substantially consisting of butterfat components.

According to the present invention a process was found which results in a product that fulfils the above-mentioned requirements and comprises the following steps:

(1) fractionating a butterfat, in which a high-melting stearin fraction and a low-melting olefin fraction are obtained the latter fraction having the following solids content, measured as N-values by using the NMR method as described in Journal of American Oil Chemists' Society, 51 (1974), 316 by Van Putte et al: $N_{10} = 25$–$40$; $N_{20} = 3$–$8$; $N_{30} = 0$–$3$;

(2) preparing an aqueous phase having a pH of 4.0–7.0:

(3) cooling and working an emulsion containing the aqueous phase and the low-melting olefin fraction referred to, under conditions leading to a product that has the required texture and plasticity.

The butterfat is prepared in a manner known per se, for example starting from a concentrated or non-concentrated cream which is converted into butter, followed by separation of the butter serum, or by direct centrifugation of cream. The fractionation of butterfat can be effected either in the presence of a solvent such as for example acetone or hexane, or according to the so-called Lanza method in the presence of a surface-active substance or in the presence of a solvent.

The fractionation is preferably conducted in the presence of organic solvents, since the use of solvents causes part of the flavour components to be lost during dissolving of the fat and the subsequent removal of the solvent. In a preferred embodiment of the invention the butterfat is first liquefied by warming it up to a temperature exceeding its melting point. Warming up is preferably done to a temperature not exceeding about 45° C. Ideally the butterfat is brought to a temperature between 35° and 40° C. Cooling of the fat is effected according to a predetermined program, for example by lowering the temperature at a rate of 1°–5° C. per minute, preferably to a temperature between 23° and 28° C., ideally 25° C. In this step the low-melting olefin, from which the fatty phase of the emulsion is prepared, is separated from the stearin fraction.

It was found that the hardness of the ultimate product, expressed in C-values and measured at 20° C. according to the method of Haighton et al as described in J.A.O.C.S. 36 (1959), p. 345, should preferably have a minimum value of 80 g/cm² m, whereas the maximum hardness, measured at 10° C., should preferably be lower than 1300 and at 5° C. preferably 1800 g/cm².

The aqueous phase may contain salts, such as for example sodium chloride and $NaHPO_4$, an acid such as for example butyric acid or citric acid, an emulsifier, thickeners and gelling agents, such as hydrocolloids, agar agar, carboxymethylcellulose, guar gum, carraghenate, locust bean gum, etc. Preferably, there is incorporated in the aqueous phase from 1 to 10%, based on the final product, of protein, preferably a milk protein, such as sodium caseinate, and ideally a mixture of milk protein and sodium caseinate.

The aqueous phase is subsequently emulsified in a fatty phase which substantially consists of the olein as defined above and, optionally, a small amount of other butterfat components, in addition to the usual emulsifiers such as mono- and diglycerides, lecithins etc., in which a pre-emulsion is prepared which is finally subjected to cooling and working. It is also possible however to feed the aqueous phase and the fatty phase separately to an apparatus in which it is cooled and worked, under conditions leading to a product having the desired plasticity.

The invention will now be further illustrated by the following Examples.

EXAMPLE I (A)—Preparation of butterfat

Butterfat is prepared by centrifugation of cream with a fat content of 38%, followed by separation of the butterfat.

(B)—Preparation of butter olein

The butterfat was heated to 40° C. and subsequently brought at 25° C. by programmed cooling (3° C./h). The stearin fraction was separated. The olein fraction obtained had the following characteristics:

$N_{10° C.} = 36$
$N_{15° C.} = 23$
$N_{20° C.} = 6$
$N_{25° C.} = 1.8$
$N_{30° C.} = 0$ (C)—Preparation of the fatty phase A fatty phase was prepared having the following composition:

butter olein: 39.5 parts
monoglyceride: 0.2 parts
lecithin: 0.2 parts.

(D)—Preparation of the aqueous phase

An aqueous phase was prepared having the following composition:
water: 50.1 parts
Na-caseinate: 8.4 parts
NaCl: 1.0 parts
$NaHPO_4.2H_2O$: 0.15 parts
emulsifier: 0.1 parts
citric acid: 0.1 parts.

The aqueous phase was emulsified in the fatty phase and the emulsion thus obtained was cooled and worked in a Votator apparatus (as described in "Margarine" by Andersen and Williams, Second Revised Edition, 1965, Pergamon Press), resulting in a spreadable product having the following hardness (measured as C-values according to the method described by Haighton et al in J.A.O.C.S. 36 (1959), pp. 345 et seq.:
$C_{5° C.} = 1600$
$C_{10° C.} = 1200$
$C_{15° C.} = 600$
$C_{20° C.} = 85$

COMPARATIVE EXAMPLE

A low calorie product (50% of water) was prepared, starting from non-fractionated butterfat and an aqueous phase that was identical with the aqueous phase of Example I. The C-values of this product were as follows:
$C_{5° C.} = 2300$
$C_{10° C.} = 1400$
$C_{15° C.} = 900$
$C_{20° C.} = 180$ The spreadability of this product and its stability were evaluated to be inferior to those of the product according to Example I.

We claim:

1. A process for producing a low-calorie water-in-oil emulsion spread based on butterfat, comprising the steps of:
   (a) melting butterfat by heating said butterfat up to a temperature not exceeding 45° C.;
   (b) cooling the molten butterfat to a temperature ranging from 20° C. to 30° C. in the absence of a solvent to fractionate said butterfat thereby yielding a higher melting stearin fraction and a lower melting olein fraction;
   (c) separating from said stearin fraction an olein fraction which has the solid fat content noted below:
   $N_{10} = 24-40$,
   $N_{20} = 3-8$ and
   $N_{30} = 0-3$;
   (d) emulsifying an aqueous phase with a pH in the range of about 4.0 to about 7.0 and constituting from about 20% to about 70% of the total spread, in a fatty phase essentially consisting of said separated olein and constituting about 30% to about 80% of the total spread to obtain a water-in-oil emulsion; and
   (e) simultaneously cooling and working said emulsion under conditions leading to a spread having a hardness of at least 80 g/cm² at 20° C., and at most 1300 g/cm² at 10° C. and of at most 1800 g/cm² at 5° C.

2. A process according to claim 1, wherein the butterfat is initially heated to a temperature in the range of about 35° C. to about 40° C. and is then fractionated in the absence of a solvent at a temperature in the range of about 23° C. to about 28° C.

3. A process according to claim 1, wherein the aqueous phase constitutes about 40% to about 70% of the total composition.

* * * * *

UNITED STATES PATENT AND TRADEMARK OFFICE
CERTIFICATE OF CORRECTION

PATENT NO. : 4,436,760
DATED : March 13, 1984
INVENTOR(S) : Verhagen, et al.

It is certified that error appears in the above—identified patent and that said Letters Patent is hereby corrected as shown below:

Column 4, line 17 (Claim 1)

"$N_{10} = 24-40$" should read --$N_{10} = 25-40$--

Signed and Sealed this

Fifth Day of March 1985

[SEAL]

Attest:

DONALD J. QUIGG

Attesting Officer    Acting Commissioner of Patents and Trademarks